US010465583B2

(12) United States Patent
Nakamura et al.

(10) Patent No.: US 10,465,583 B2
(45) Date of Patent: Nov. 5, 2019

(54) EXHAUST-GAS-PURIFICATION CATALYTIC HEATING DEVICE

(71) Applicant: HONDA MOTOR CO., LTD., Tokyo (JP)

(72) Inventors: Kenichiro Nakamura, Wako (JP); Ryosuke Ibata, Wako (JP); Daiji Kawaguchi, Wako (JP); Hirotaka Sato, Wako (JP); Tetsuya Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 15/709,983

(22) Filed: Sep. 20, 2017

(65) Prior Publication Data
US 2018/0087429 A1 Mar. 29, 2018

(30) Foreign Application Priority Data
Sep. 23, 2016 (JP) .................. 2016-185554

(51) Int. Cl.
F01N 3/28 (2006.01)
F01N 3/20 (2006.01)
F01N 13/00 (2010.01)

(52) U.S. Cl.
CPC ............ *F01N 3/28* (2013.01); *F01N 3/2013* (2013.01); *F01N 13/008* (2013.01); *F01N 2590/04* (2013.01); *Y02T 10/26* (2013.01)

(58) Field of Classification Search
CPC ........ F01N 3/2026; F01N 3/2013; F01N 3/28; F01N 13/008
(Continued)

(56) References Cited

U.S. PATENT DOCUMENTS 5,140,812 A 8/1992 Cornelison et al.
5,317,869 A * 6/1994 Takeuchi .............. F01N 3/2026
422/174
(Continued)

FOREIGN PATENT DOCUMENTS

EP 0808077 A2 11/1997
EP 0942158 A2 9/1999
(Continued)

OTHER PUBLICATIONS

European Office Action dated Oct. 29, 2018, for corresponding European Application No. 17192753.6.
(Continued)

Primary Examiner — Tom P Duong
(74) Attorney, Agent, or Firm — Birch, Stewart, Kolasch & Birch, LLP

(57) ABSTRACT

In an exhaust-gas-purification catalytic heating device that houses a current heater in a conductive metallic housing where a catalytic unit is housed, the current heater being arranged at an upstream side of the catalytic unit along a distribution direction of exhaust gas, the current heater has a negative electrode directly coupled to the housing electrically coupled to an external ground wire, the current heater has a positive electrode with which a rod-shaped terminal is continuous, the terminal passing through the housing in an electrically insulating state so as to be electrically coupled to a power line outside the housing, and the terminal has a portion protruding from the housing, the protruding portion being covered with a terminal cover.

12 Claims, 9 Drawing Sheets

(58) Field of Classification Search
USPC .......................................... 422/174; 219/202
See application file for complete search history.

(56) References Cited

U.S. PATENT DOCUMENTS

| | | | |
|---|---|---|---|
| 5,384,099 A * | 1/1995 | Sheller | B01J 35/04 422/174 |
| 5,411,711 A * | 5/1995 | Swars | B01J 35/0033 422/177 |
| 5,571,485 A | 11/1996 | Brunson | |
| 5,746,053 A | 5/1998 | Hibino | |
| 5,935,473 A | 8/1999 | Hashimoto et al. | |
| 5,948,504 A * | 9/1999 | Swars | B32B 15/04 422/174 |
| 6,060,699 A | 5/2000 | Sakurai et al. | |
| 6,176,081 B1 | 1/2001 | Shimasaki et al. | |
| 8,288,688 B2 * | 10/2012 | Konieczny | B01D 46/525 219/202 |
| 8,761,586 B2 * | 6/2014 | Bruck | B01J 35/0033 219/202 |
| 2001/0042744 A1 * | 11/2001 | Tachikawa | H01L 21/67103 219/444.1 |

FOREIGN PATENT DOCUMENTS

| | | |
|---|---|---|
| EP | 1900624 A1 | 3/2008 |
| EP | 1967712 A2 | 9/2008 |
| JP | 60-52329 U1 | 4/1985 |
| JP | 2-147820 U | 12/1990 |
| JP | 5-77528 U | 10/1993 |
| JP | 9-158717 A | 6/1997 |
| JP | 11-257058 A | 9/1999 |
| JP | 2015-75068 A | 4/2015 |
| WO | WO 96/34187 A1 | 10/1996 |
| WO | WO 2013/104754 A1 | 7/2013 |

OTHER PUBLICATIONS

Extended European Search Report, dated Jan. 22, 2018, for European Application No. 17192753.6.

* cited by examiner

EXHAUST-GAS-PURIFICATION CATALYTIC HEATING DEVICE

BACKGROUND OF THE INVENTION

Field of the Invention

The present invention relates to an exhaust-gas-purification catalytic heating device that houses a current heater in a conductive metallic housing where a catalytic unit is housed, the current heater being arranged at an upstream side of the catalytic unit along a distribution direction of exhaust gas.

Description of the Related Art

There has been known an exhaust-gas-purification catalytic heating device of Japanese Patent Application Laid-open No. 11-257058 where a pair of terminals project from a housing on a diagonal line of the housing. The pair of terminals are respectively continuous with a positive electrode and a negative electrode of a current heater. There has been known an exhaust-gas-purification catalytic heating device of Japanese Utility Model Application Laid-open No. 60-52329 where a plurality of terminals project from a housing. The plurality of terminals are brought together at one position in a peripheral direction of the housing.

Now, as at a saddle-ride type vehicle, when a disposing space of an exhaust system is limited, protection of the terminal becomes a problem in the structure as disclosed in above-described Japanese Patent Application Laid-open No. 11-257058 and Japanese Utility Model Application Laid-open No. 60-52329.

SUMMARY OF THE INVENTION

The present invention has been made in view of the above-described circumstances, and an object of the present invention is to provide an exhaust-gas-purification catalytic heating device configured to protect a terminal continuous with a current heater, with good space efficiency even under a condition where a disposing space of an exhaust system is limited.

In order to achieve the object, according to a first feature of the present invention, there is provided an exhaust-gas-purification catalytic heating device that houses a current heater in a conductive metallic housing where a catalytic unit is housed, the current heater being arranged at an upstream side of the catalytic unit along a distribution direction of exhaust gas, wherein the current heater has a negative electrode directly coupled to the housing electrically coupled to an external ground wire, the current heater has a positive electrode with which a rod-shaped terminal is continuous, the terminal passing through the housing in an electrically insulating state so as to be electrically coupled to a power line outside the housing, and the terminal has a portion protruding from the housing, the protruding portion being covered with a terminal cover.

With the first feature of the present invention, the negative electrode of the current heater is directly coupled to the housing electrically coupled to the external ground wire. The rod-shaped terminal continuous with the positive electrode of the current heater passes through the housing in the electrically insulating state so as to be electrically coupled to the power line outside the housing. Thus, only the single terminal projects from the housing. This easily ensures a space at which the terminal is arranged at a peripheral area of the housing. Moreover, this ensures downsizing of the terminal cover so as to protect the terminal with good space efficiency.

According to a second feature of the present invention, in addition to the first feature, the terminal is disposed to project to an upper side of a vehicle body of a saddle-ride type vehicle from the housing.

With the second feature of the present invention, the terminal projects from the housing to an upper side of the vehicle body of the saddle-ride type vehicle. This facilitates the protection of the terminal by the terminal cover, and facilitates waterproofing of the terminal by covering the terminal with the terminal cover from above.

According to a third feature of the present invention, in addition to the second feature, an exhaust gas sensor is disposed at an exhaust system at the upstream side of the current heater in the distribution direction of the exhaust gas, the exhaust gas sensor extending to an upside of the saddle-ride type vehicle, and the terminal projects from the housing in a direction identical to an extending direction of the exhaust gas sensor when the vehicle is viewed from a front.

With the third feature of the present invention, the exhaust gas sensor disposed at the exhaust system at the upstream side of the current heater in the distribution direction of the exhaust gas, and the terminal extend to the upside of the saddle-ride type vehicle and in the identical direction when the vehicle is viewed from the front. This reduces projection from the exhaust system of the exhaust gas sensor, the terminal, and the terminal cover to an outside in a vehicle width direction so as to enhance space efficiency of wiring and the like.

According to a fourth feature of the present invention, in addition to any one of the first feature to the third feature, there is provided the exhaust-gas-purification catalytic heating device comprising: a current sensor that detects current flowing through the power line; and a current cutoff device that cuts off electricity supplied from a power source to the current heater in accordance with detection of overcurrent at the current sensor.

With the fourth feature of the present invention, the current cutoff device cuts off the electricity supplied from the power source to the current heater, in response to the detection of the overcurrent at the current sensor that detects the current flowing through the power line. Thus, even if by any chance deformation by external force of the terminal cover occurs to generate short circuit between the terminal and the terminal cover, wasteful flow of the current can be prevented. This increases a degree of freedom for selecting a material of the terminal cover.

According to a fifth feature of the present invention, in addition to the second feature, the terminal cover is formed of a metallic cover substrate body secured to the housing side, and an insulating cover made of an insulating material and covering an upper portion of the terminal so as to be attachably/removably mounted on the cover substrate body.

With the fifth feature of the present invention, the terminal cover is formed of the metallic cover substrate body secured to the housing side, and the insulating cover that covers the upper portion of the terminal to be attachably/removably mounted on the cover substrate body. Thus, after a countermeasure against heat is performed such that the metallic cover substrate body receives heat transmitted from the housing to the terminal cover by heat generation of the terminal, the insulating cover made of the insulating material surely covers the terminal so as to ensure high working efficiency at a coupling work of the power line to the terminal.

According to a sixth feature of the present invention, in addition to any one of the first feature to the third feature, the terminal cover is formed with a guiding portion so as to guide the power line continuous with the terminal, the guiding portion being arranged at a side opposite to the catalytic unit with respect to the terminal.

With the sixth feature of the present invention, the guiding portion arranged at the opposite side of the catalytic unit with respect to the terminal is disposed at the terminal cover. This guiding portion guides the power line. This prevents the power line from projecting to the outside in the vehicle width direction from the housing, and routes the power line at the opposite side of the catalytic unit so as to prevent heat influence from the catalytic unit from reaching to the power line as much as possible.

According to a seventh feature of the present invention, in addition to the fifth feature, a discharge hole is formed between a lower portion of the cover substrate body and an outer surface of the housing, the discharge hole discharging water in the cover substrate body.

With the seventh feature of the present invention, the discharge hole is formed between the lower portion of the cover substrate body and the outer surface of the housing. This can effectively discharge the water having entered into the terminal cover so as to contribute to improvement of insulating property.

According to an eighth feature of the present invention, in addition to the fifth feature, the insulating cover is attachably/removably mounted on the cover substrate body by a mounting member that is arranged in a direction along a planar surface perpendicular to an extending direction of the power line from the terminal, and the mounting member is arranged in a region surrounded by the terminal, the power line, and the outer surface of the housing, on a projection view to a planar surface extending along the extending direction of the power line from the terminal and passing through an axis of the terminal.

With the eighth feature of the present invention, the insulating cover is attachably/removably mounted on the cover substrate body by the mounting member arranged in the direction along the planar surface perpendicular to the extending direction of the power line. This mounting member is arranged in the region surrounded by the terminal, the power line, and the outer surface of the housing, on the projection view to the planar surface extending along the extending direction from the terminal of the power line and passing through the axis of the terminal. This reduces projection of the mounting member from the terminal cover so as to ensure downsizing of a terminal cover unit including the mounting member.

The above and other objects, characteristics and advantages of the present invention will be clear from detailed descriptions of the preferred embodiment which will be provided below while referring to the attached drawings.

DESCRIPTION OF THE PREFERRED EMBODIMENT

The following describes an embodiment of the present invention referring to the accompanying FIG. 1 to FIG. 9. The following description defines respective directions of front, rear, up, down, right, and left as directions viewed from an occupant riding on a two-wheeled motor vehicle.

Figure 1:
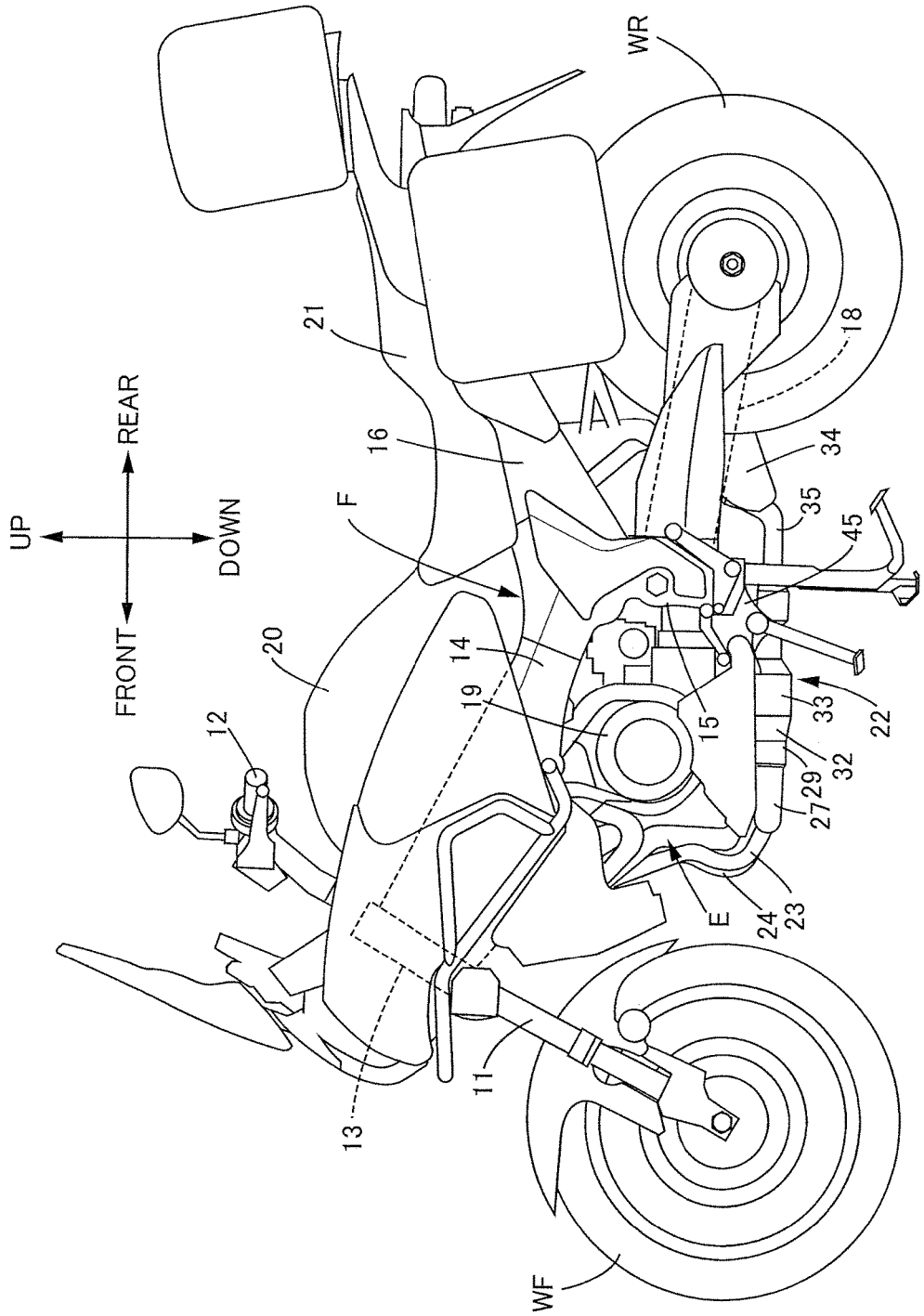
FIG. 1 is a left side view of a two-wheeled motor vehicle.

First, in FIG. 1, a two-wheeled motor vehicle, which is a saddle-ride type vehicle, has a body frame F. The body frame F includes a head pipe 13, a pair of left and right main frames 14, a pair of left and right pivot frames 15, and a pair of left and right seat rails 16. The head pipe 13 steerably supports a front fork 11 and a bar-shaped steering handlebar 12. The front fork 11 journals a front wheel WF. The pair of left and right main frames 14 extend downward to the rear from the head pipe 13. The pair of left and right pivot frames 15 are continued to rear ends of these main frames 14 so as to extend downward. The pair of left and right seat rails 16 are connected with the rear ends of the main frames 14 so as to extend upward to the rear.

The pivot frames 15 support a swing arm 18 swingably in an up-down direction. The swing arm 18 has rear end portions to which a rear wheel WR is journaled. The rear wheel WR is driven by power provided from an engine E. The engine E has an engine main body 19 that is arranged between the front wheel WF and the rear wheel WR and mounted on the body frame F.

On the main frames 14 of the body frame F, a fuel tank 20 is mounted to be arranged above the engine E. The seat rails 16 support a tandem-type riding seat 21 arranged at the rear of the fuel tank 20.

Figure 2:
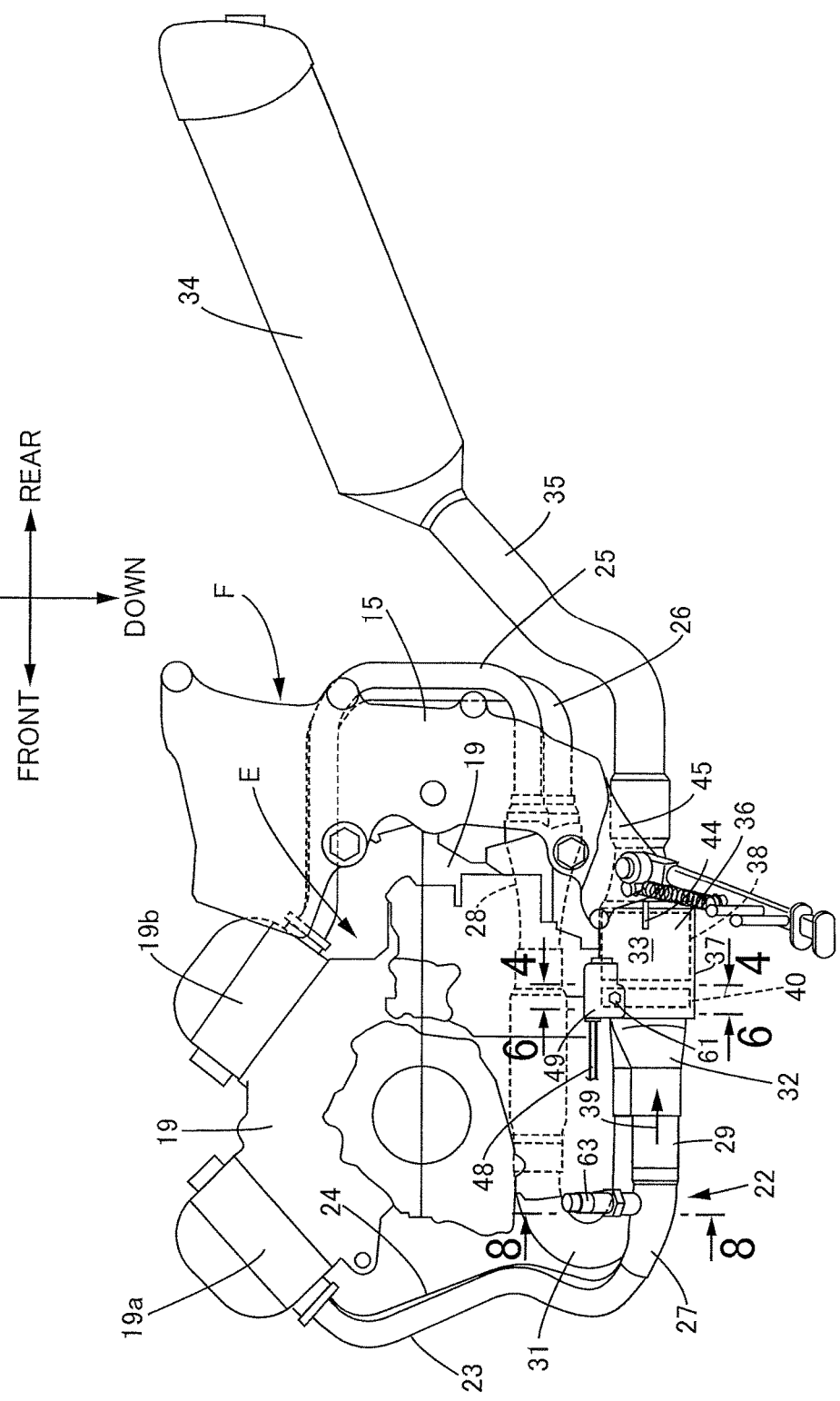
FIG. 2 is a left side view of an engine main body and an exhaust system.

With reference to FIG. 2 together, the engine main body 19 is configured to be a V-type four-cylinder engine including a front portion cylinder 19a and a rear portion cylinder 19b arranged into a V shape. The engine E includes an exhaust system 22. The exhaust system 22 includes a pair of front portion individual exhaust pipes 23, 24, a pair of rear portion individual exhaust pipes 25, 26, a front portion collecting pipe 27, a rear portion collecting pipe 28, a front portion common exhaust pipe 29, a rear portion common exhaust pipe 31, a common collecting pipe 32, a catalytic converter 33, an exhaust muffler 34, and a common exhaust pipe 35. The pair of front portion individual exhaust pipes 23, 24 have upstream end portions coupled to the front portion cylinder 19a and extend downward to the left side from the front of the engine main body 19. The pair of rear portion individual exhaust pipes 25, 26 have upstream end portions coupled to the rear portion cylinder 19b and extend downward to the right side from the rear of the engine main body 19. The front portion collecting pipe 27 is commonly coupled to downstream end portions of the pair of front portion individual exhaust pipes 23, 24. The rear portion collecting pipe 28 is commonly coupled to downstream end portions of the pair of rear portion individual exhaust pipes 25, 26. The front portion common exhaust pipe 29 has an upstream end portion coupled to the front portion collecting pipe 27 and linearly extends. The rear portion common exhaust pipe 31 is curvedly formed into a substantially U shape and has an upstream end portion coupled to the rear portion collecting pipe 28. The common collecting pipe 32 is commonly coupled to downstream end portions of the front portion common exhaust pipe 29 and the rear portion common exhaust pipe 31. The catalytic converter 33 is coupled to a downstream end portion of the common collecting pipe 32. The exhaust muffler 34 is arranged at the right side of the rear wheel WR. The common exhaust pipe 35 couples the catalytic converter 33 to the exhaust muffler 34.

Figure 3:
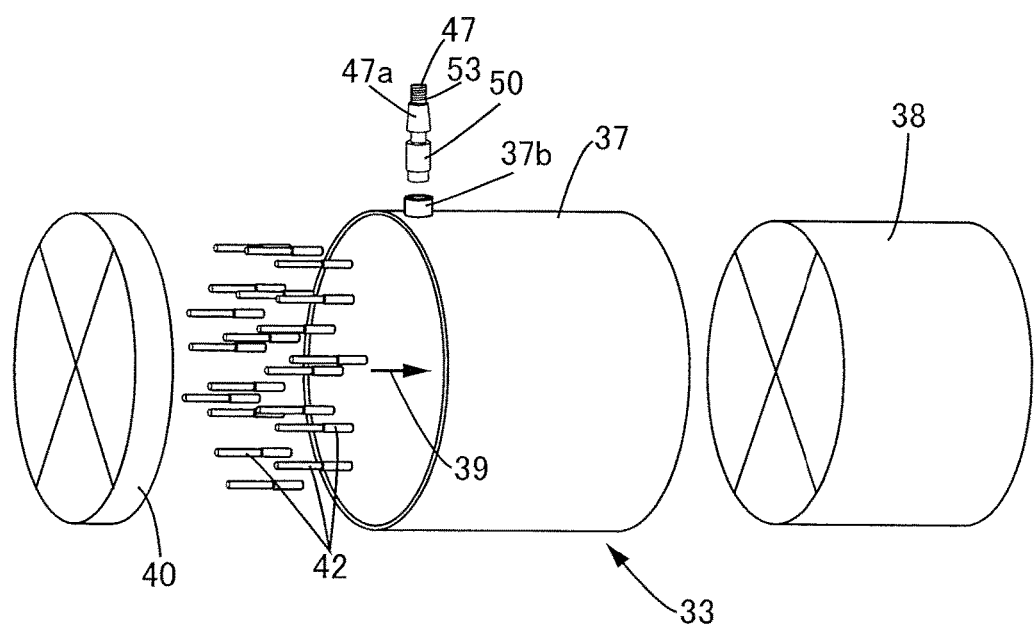
FIG. 3 is an exploded perspective view where a catalytic converter is simplified.

With reference to FIG. 3 together, the catalytic converter 33 is formed by housing a catalytic unit 38 in a cylindrically-shaped housing 37 made of conductive metal. The housing 37 houses a current heater 40. The current heater 40 is arranged at the upstream side of the catalytic unit 38 along a distribution direction 39 of exhaust gas in the housing 37, the front side along a vehicle front-rear direction in the embodiment.

Figure 4:
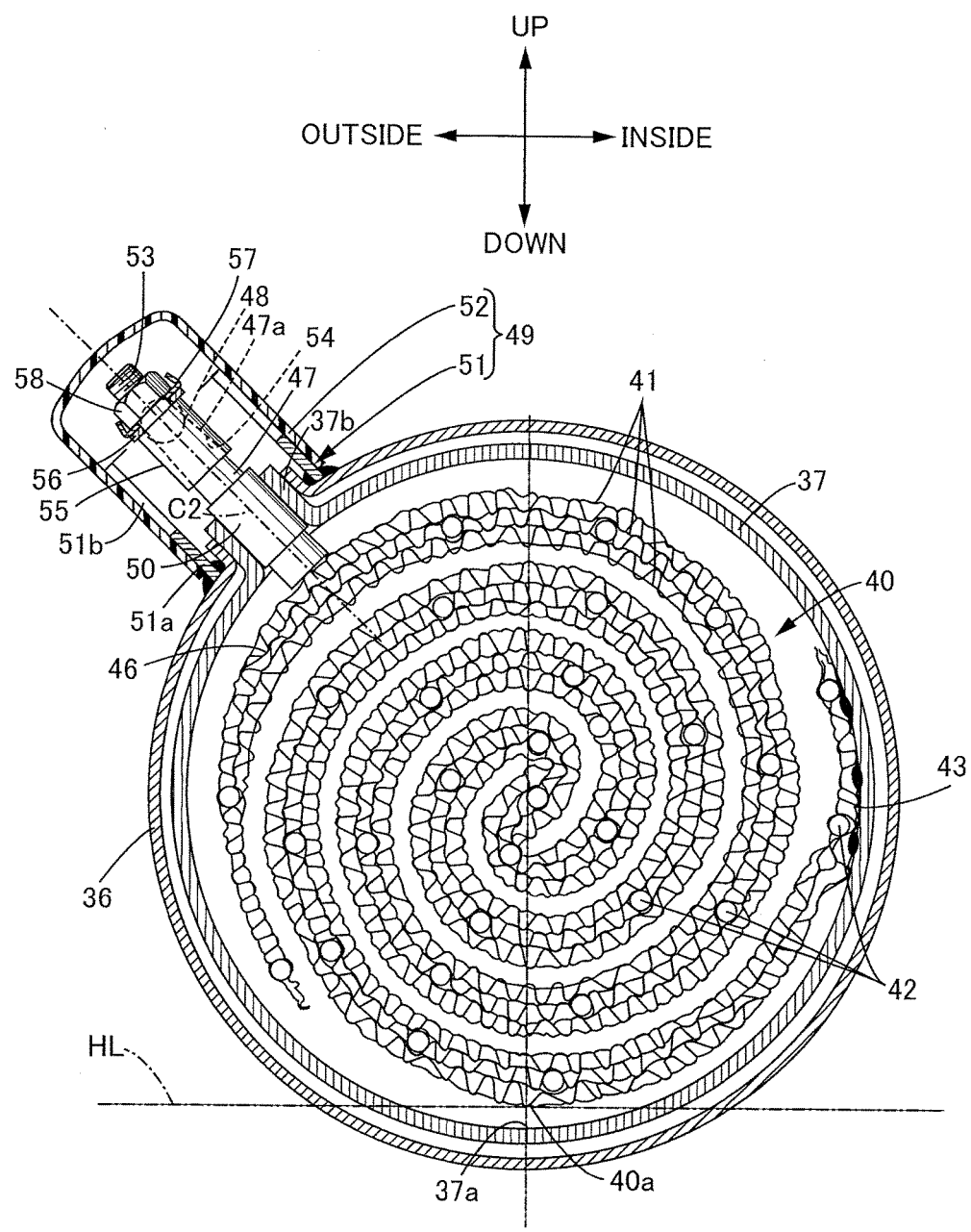
FIG. 4 is an enlarged sectional view taken along the line 4-4 in FIG. 2.

In FIG. 4, the current heater 40 is formed by stacking three strip-shaped conductive members 41 and winding the conductive members 41 into a double spiral. The conductive member 41 is formed by fixedly securing a corrugated plate to a flat plate, for example, made of conductive metal. The catalytic unit 38 is also formed by attaching a catalyst to a carrier constituted similarly to the current heater 40. The current heater 40 is housed in and secured to the housing 37 by interposing a plurality of support pins 42 between the catalytic unit 38 and the current heater 40. The catalytic unit 38 is housed in and secured to the housing 37.

Focusing on FIG. 4, a position of the current heater 40 in the housing 37 is set such that a horizontal surface HL that passes through a lowest end 40a of the current heater 40 in the housing 37 is positioned above a lowest end 37a of an inner surface of the housing 37. This prevents the current heater 40 from being immersed in condensed water generated in the housing 37.

The current heater 40 has a negative electrode 43 directly coupled to the inner surface of the housing 37 by brazing. Meanwhile, the housing 37 is covered with a cover 36 formed into a cylindrical shape with a conductive metal. Welding the cover 36 to the housing 37 makes a state where the housing 37 is electrically coupled to the cover 36. To this cover 36, as illustrated in FIG. 2, one end portion of a conductive metallic support rod 44 that will be an external ground wire is welded. That is, the housing 37 is in a state electrically coupled to the support rod 44 that is the external ground wire. The support rod 44 has an opposite end portion fixedly secured to a conductive metallic step holder 45 secured to the left side pivot frame 15 of the body frame F. That is, the negative electrode 43 is electrically coupled to the support rod 44 that is the external ground wire, via the housing 37 and the cover 36.

The current heater 40 has a positive electrode 46. The positive electrode 46 is continuous with a rod-shaped terminal 47. The terminal 47 is disposed to project to an upper side of a vehicle body of the two-wheeled motor vehicle. The terminal 47 passes through the housing 37 in an electrically insulating state. The terminal 47 is electrically coupled to a power line 48 outside the housing 37. The terminal 47 has a portion protruding from the housing 37. The protruding portion is covered with a terminal cover 49.

The housing 37 has a part corresponding to the positive electrode 46. To the part, a cylindrically-shaped guide tube portion 37b is fixedly secured so as to project outward. The terminal 47 has one end portion brazed to the positive electrode 46 of the current heater 40. The terminal 47 interposes a supporting member 50 between the terminal 47 and the guide tube portion 37b and projects upward from the housing 37. The supporting member 50 surrounds the terminal 47 and is formed into a cylindrical shape with an insulating material.

Figure 5:
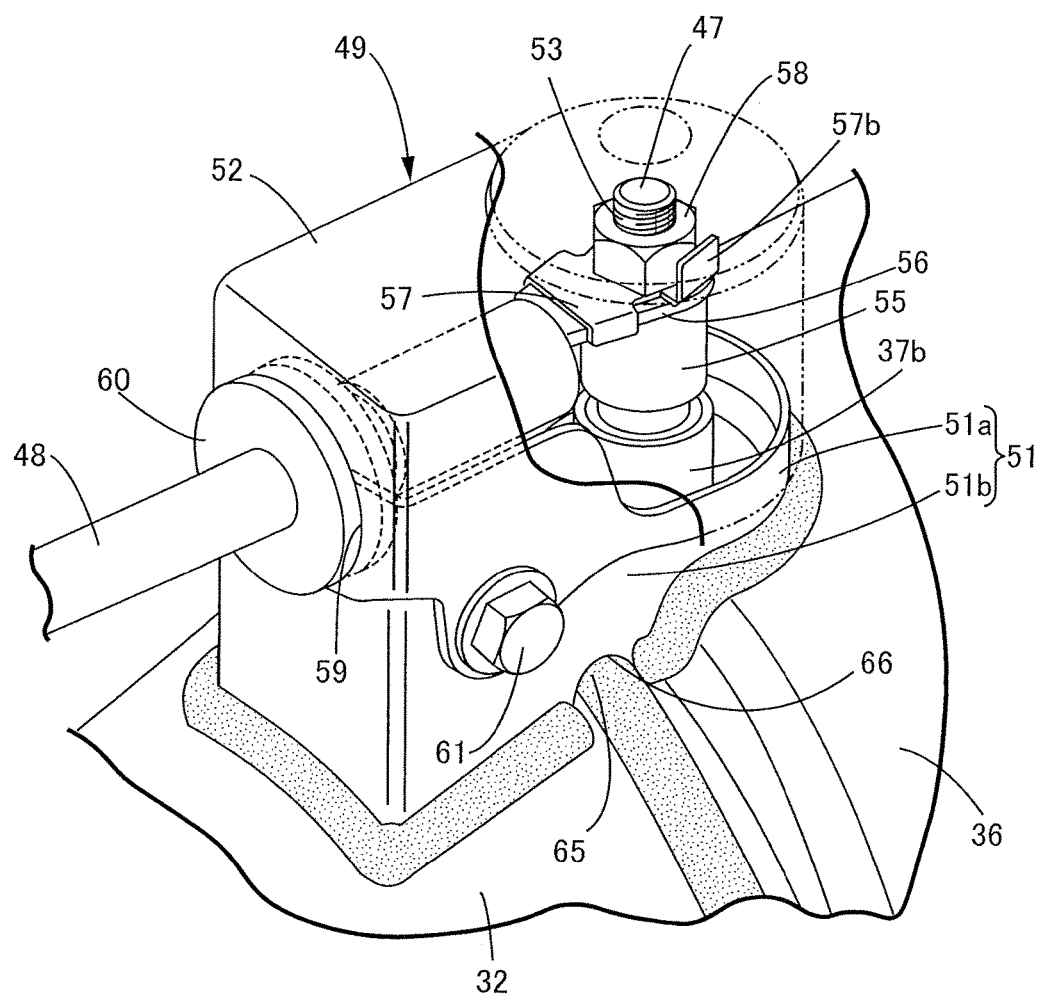
FIG. 5 is an enlarged perspective view of a terminal cover and its vicinity.
Figure 6:
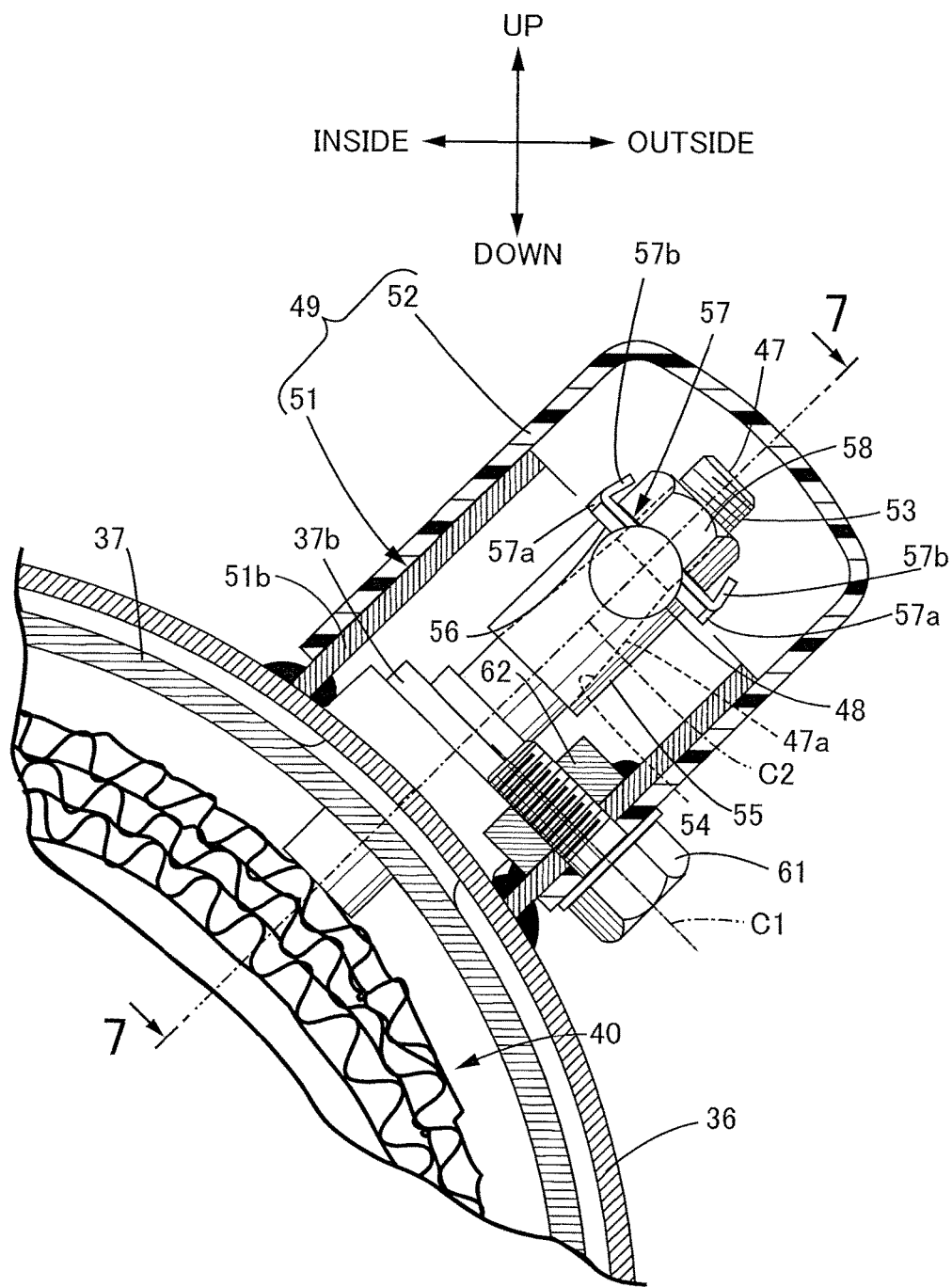
FIG. 6 is an enlarged sectional view taken along the line 6-6 in FIG. 2.
Figure 7:
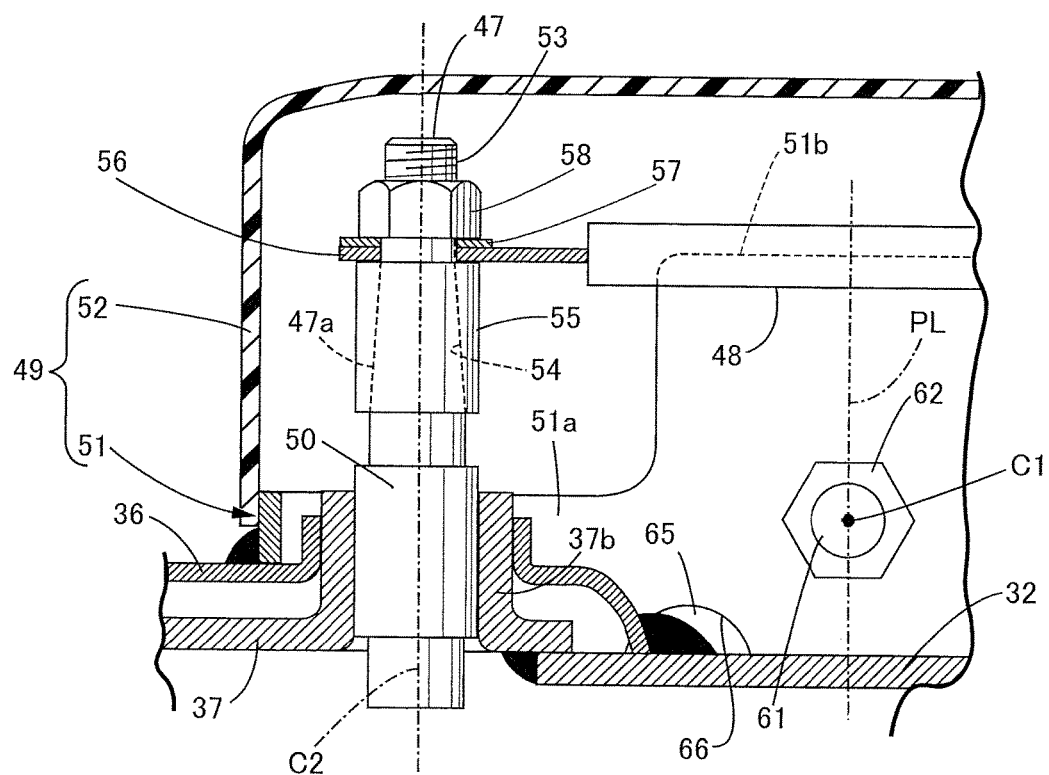
FIG. 7 is a sectional view taken along the line 7-7 in FIG. 6.

With reference to FIG. 5 to FIG. 7 together, the terminal cover 49 is formed of a metallic cover substrate body 51 and an insulating cover 52. The insulating cover 52 is made of an insulating material and covers an upper portion of the terminal 47 to be attachably/removably mounted on the cover substrate body 51.

The cover substrate body 51 is formed to integrally have an arc-shaped wall portion 51a and a rectangular-shaped wall portion 51b. The arc-shaped wall portion 51a is formed to have an arc-shaped cross section so as to cover a part of the guide tube portion 37b from a side. The rectangular-shaped wall portion 51b extends forward in the vehicle front-rear direction from the arc-shaped wall portion 51a. An amount of projection of the rectangular-shaped wall portion 51b from an outer surface of the housing 37 is set larger than an amount of projection of the arc-shaped wall portion 51a.

This cover substrate body 51 is secured to the housing 37 side. In the embodiment, the cover substrate body 51 is welded to the cover 36 and the common collecting pipe 32. The common collecting pipe 32 is welded to the housing 37 and the cover 36.

The insulating cover 52 partially overlaps with the cover substrate body 51 and is formed into a bottomed tube shape while having an inner shape corresponding to an outer shape of the cover substrate body 51.

The portion of the terminal 47 protruding from the housing 37 has an outer end portion. The outer end portion has an outer periphery on which a male screw 53 is engraved. The portion of the terminal 47 protruding from the housing 37 has an intermediate portion at which a tapered portion 47a having a small diameter end on the male screw 53 side is integrally disposed. Meanwhile, the power line 48 has one end portion to which a terminal plate 56 is fixedly secured. To this terminal plate 56, a fitting tube 55 is welded. The fitting tube 55 has a taper hole 54 fitted into the tapered portion 47a of the terminal 47. In a state where the tapered portion 47a is fitted into the taper hole 54 of the fitting tube 55, against the terminal plate 56, a lock washer 57 is abutted from an opposite side of the tapered portion 47a. This lock washer 57 is sandwiched between a nut 58 and the terminal plate 56. The nut 58 is screwed with the male screw 53. Moreover, the lock washer 57 integrally has a pair of engagement protrusions 57a and a pair of engagement protrusions 57b. The pair of engagement protrusions 57a are engaged with opposite sides of the terminal plate 56. The pair of engagement protrusions 57b are engaged with the nut 58. This lock washer 57 prevents rotation of the nut 58 to surely maintain a coupling condition of the power line 48 to the terminal 47.

At the terminal cover 49, a guide hole 59 as a guiding portion is formed to guide the power line 48 continuous with the terminal 47. In the embodiment, the guide hole 59 is formed by cooperation of the cover substrate body 51 and the insulating cover 52 that constitute the terminal cover 49. The power line 48 passes through a grommet 60 made of rubber and mounted on the guide hole 59, so as to be led outside the terminal cover 49.

Moreover, the guide hole 59 is formed at an opposite side of the catalytic unit 38 with respect to the terminal 47, at the terminal cover 49 at a front side of the terminal 47 in the embodiment. The guide hole 59 is formed by cooperation of a recess disposed at a front upper portion of the cover substrate body 51 and a recess disposed at a front lower portion of the insulating cover 52. The power line 48 is led forward in the vehicle front-rear direction from the terminal cover 49.

The insulating cover 52 is attachably/removably mounted on the cover substrate body 51 by a bolt 61 that is a mounting member. The bolt 61 is inserted into a part facing outside in the vehicle width direction of a front portion of the insulating cover 52 and a part facing outside in the vehicle width direction of the rectangular-shaped wall portion 51b of the cover substrate body 51. The bolt 61 is screwed with a weld nut 62 fixedly secured to an inner surface of the rectangular-shaped wall portion 51b.

Moreover, the bolt 61 has an axis C1 arranged along a planar surface PL (see FIG. 7) perpendicular to an extending direction of the power line 48 from the terminal 47. On a projection view (FIG. 7) to a planar surface that extends along the extending direction of the power line 48 from the terminal 47 and passes through an axis C2 of the terminal 47, the bolt 61 is arranged in a region surrounded by the terminal 47, the power line 48, and the outer surface of the housing 37.

Figure 8:
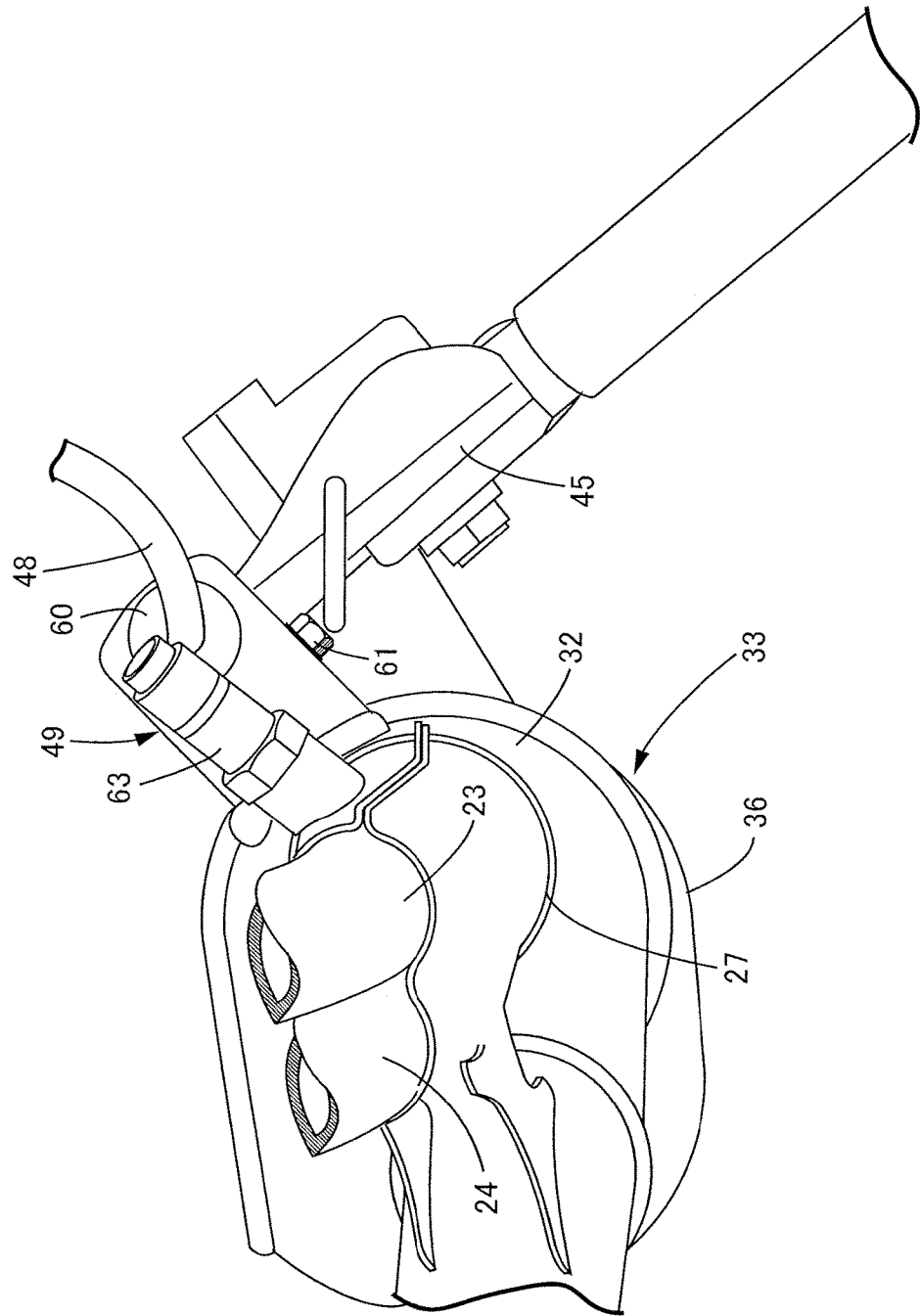
FIG. 8 is an enlarged sectional view taken along the line 8-8 in FIG. 2.

With reference to FIG. 8 together, in the exhaust system 22 of the engine E, an exhaust gas sensor 63 is mounted at the upstream side of the current heater 40 in the distribution direction 39 of the exhaust gas, on an upper portion of the front portion collecting pipe 27 in the exhaust system 22 in the embodiment. This exhaust gas sensor 63 is arranged to extend to an upside of the two-wheeled motor vehicle. The terminal 47 and the terminal cover 49 that covers this terminal 47 project from the housing 37 in a direction identical to the extending direction of the exhaust gas sensor 63 when the vehicle is viewed from the front. In the embodiment, the exhaust gas sensor 63 is arranged to extend outward in the vehicle width direction of the two-wheeled motor vehicle and obliquely upward. The terminal 47 and the terminal cover 49 are also arranged to extend outward in the vehicle width direction of the two-wheeled motor vehicle and obliquely upward.

Now, between a lower portion of the cover substrate body 51 and the outer surface of the housing 37, as clearly illustrated in FIG. 5 and FIG. 7, a discharge hole 65 is formed. The discharge hole 65 discharges water in the cover substrate body 51. In the embodiment, the discharge hole 65 is formed by disposing a cutout 66 at a lower portion of the rectangular-shaped wall portion 51b of the cover substrate body 51.

Figure 9:
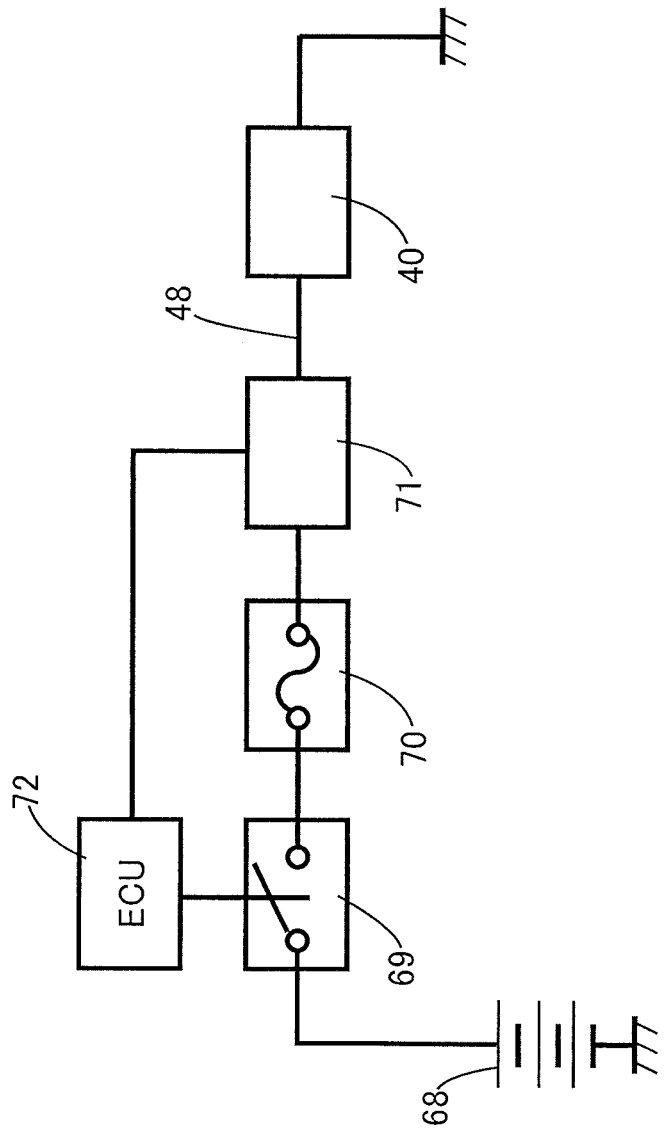
FIG. 9 is a view illustrating a configuration of an electric circuit including a current heater.

In FIG. 9, at the power line 48 that supplies electricity from a battery 68 as a power source mounted on the two-wheeled motor vehicle to the current heater 40, in an order from the battery 68 side, a switch 69, a fuse 70, and a current sensor 71 are disposed. The switch 69 is a current cutoff means configured to cut off the electricity supplied to the current heater 40. Current detected at the current sensor 71 is input to an ECU 72. The ECU 72 cuts off the switch 69 when determining that the current detected at the current sensor 71 is overcurrent. That is, the switch 69 cuts off the electricity supplied from the battery 68 to the current heater 40 in response to the detection of the overcurrent at the current sensor 71.

The following describes actions of the embodiment. The negative electrode 43 of the current heater 40 is directly coupled to the housing 37 electrically coupled to the support rod 44 that is the external ground wire. The rod-shaped terminal 47 continuous with the positive electrode 46 of the current heater 40 passes through the housing 37 in an electrically insulating state so as to be electrically coupled to the power line 48 outside the housing 37. The portion of the terminal 47 protruding from the housing 37 is covered with the terminal cover 49. Thus, only the single terminal 47 projects from the housing 37. This easily ensures a space at which the terminal 47 is arranged at a peripheral area of the housing 37. Moreover, this ensures downsizing of the terminal cover 49 so as to protect the terminal 47 with good space efficiency.

The terminal 47 is disposed to project to the upper side of the vehicle body of the two-wheeled motor vehicle from the housing 37. This facilitates the protection of the terminal 47 by the terminal cover 49, and facilitates waterproofing of the terminal 47 by covering the terminal 47 with the terminal cover 49 from above.

The exhaust gas sensor 63 extending to the upside of the two-wheeled motor vehicle is disposed at the exhaust system 22 at the upstream side of the current heater 40 in the distribution direction 39 of the exhaust gas. The terminal 47 projects from the housing 37 in the direction identical to the extending direction of the exhaust gas sensor 63 when the vehicle is viewed from the front. This reduces projection from the exhaust system 22 of the exhaust gas sensor 63, the terminal 47, and the terminal cover 49 to the outside in the vehicle width direction so as to enhance space efficiency of wiring and the like.

The current flowing through the power line 48 is detected at the current sensor 71. The switch 69 cuts off the electricity supplied from the battery 68 to the current heater 40, in response to the detection of the overcurrent at the current sensor 71. Thus, even if by any chance deformation by external force of the terminal cover 49 occurs to generate short circuit between the terminal 47 and the terminal cover 49, wasteful flow of the current can be prevented. This increases a degree of freedom for selecting a material of the terminal cover 49.

The terminal cover 49 is formed of the metallic cover substrate body 51 secured to the housing 37 side, and the insulating cover 52. The insulating cover 52 is made of an insulating material and covers the upper portion of the terminal 47 to be attachably/removably mounted on the cover substrate body 51. Thus, after a countermeasure against heat is performed such that the metallic cover substrate body 51 receives heat transmitted from the housing 37 to the terminal cover 49 by heat generation of the terminal 47, the insulating cover 52 made of an insulating material surely covers the terminal 47 so as to ensure high working efficiency at a coupling work of the power line 48 to the terminal 47.

At the terminal cover 49, the guide hole 59 is formed to guide the power line 48 continuous with the terminal 47. The guide hole 59 is arranged at the opposite side of the catalytic unit 38 with respect to the terminal 47. This prevents the power line 48 from projecting to the outside in the vehicle width direction from the housing 37, and routes the power line 48 at the opposite side of the catalytic unit 38 so as to prevent heat influence from the catalytic unit 38 from reaching to the power line 48 as much as possible.

Between the lower portion of the cover substrate body 51 and the outer surface of the housing 37, the discharge hole 65 is formed. The discharge hole 65 discharges the water in the cover substrate body 51. This can effectively discharge the water immersed in the terminal cover 49 so as to contribute to improvement of insulating property.

Further, the insulating cover 52 is attachably/removably mounted on the cover substrate body 51 by the bolt 61. The bolt 61 is arranged in the direction along the planar surface PL perpendicular to the extending direction of the power line 48 from the terminal 47. The bolt 61 is arranged in the region surrounded by the terminal 47, the power line 48, and the outer surface of the housing 37, on the projection view to the planar surface. The planar surface extends along the extending direction of the power line 48 from the terminal 47 and passes through the axis C2 of the terminal 47. This reduces projection of the bolt 61 from the terminal cover 49 so as to ensure downsizing of a terminal cover unit including the bolt 61.

The embodiment of the present invention has been described above. The present invention is not limited to the above-described embodiment. Various changes of design are possible without departing from the gist of the present invention.

For example, while the above-described embodiment has been described related to the two-wheeled motor vehicle, the present invention is widely applicable to saddle-ride type vehicles including a three-wheeled motor vehicle.

While in the above-described embodiment, the terminal cover 49 that covers the portion of the terminal 47 protruding from the housing 37 is formed of the metallic cover substrate body 51 welded to the housing 37 and the insulating cover 52 made of an insulating material and covering the upper portion of the terminal 47 to be attachably/removably mounted on the cover substrate body 51, the entire terminal cover may be made of an insulating material such as resin and the like, or the entire terminal cover may be made of a metallic material.

What is claimed is:

1. An exhaust-gas-purification catalytic heating device that houses a current heater in a conductive metallic housing where a catalytic unit is housed, the current heater being arranged at an upstream side of the catalytic unit along a distribution direction of exhaust gas,
    wherein the current heater has a negative electrode directly coupled to the housing electrically coupled to an external ground wire,
    the current heater has a positive electrode with which a rod-shaped terminal is continuous, the terminal passing through the housing in an electrically insulating state so as to be electrically coupled to a power line outside the housing, and
    the terminal has a portion protruding from the housing, the protruding portion being covered with a terminal cover.

2. The exhaust-gas-purification catalytic heating device according to claim 1,
    wherein the terminal is disposed to project to an upper side of a vehicle body of a saddle-ride type vehicle from the housing.

3. The exhaust-gas-purification catalytic heating device according to claim 2,
    wherein an exhaust gas sensor is disposed at an exhaust system at the upstream side of the current heater in the distribution direction of the exhaust gas, the exhaust gas sensor extending to an upside of the saddle-ride type vehicle, and
    the terminal projects from the housing in a direction identical to an extending direction of the exhaust gas sensor when the vehicle is viewed from a front.

4. The exhaust-gas-purification catalytic heating device according to claim 3, comprising:
    a current sensor that detects current flowing through the power line; and
    a current cutoff device that cuts off electricity supplied from a power source to the current heater in accordance with detection of overcurrent at the current sensor.

5. The exhaust-gas-purification catalytic heating device according to claim 3,
    wherein the terminal cover is formed with a guiding portion so as to guide the power line continuous with the terminal, the guiding portion being arranged at a side opposite to the catalytic unit with respect to the terminal.

6. The exhaust-gas-purification catalytic heating device according to claim 2,
    wherein the terminal cover is formed of a metallic cover substrate body secured to the housing side, and an insulating cover made of an insulating material and covering an upper portion of the terminal so as to be attachably/removably mounted on the cover substrate body.

7. The exhaust-gas-purification catalytic heating device according to claim 6,
    wherein a discharge hole is formed between a lower portion of the cover substrate body and an outer surface of the housing, the discharge hole discharging water in the cover substrate body.

8. The exhaust-gas-purification catalytic heating device according to claim 6,
    wherein the insulating cover is attachably/removably mounted on the cover substrate body by a mounting member that is arranged in a direction along a planar surface perpendicular to an extending direction of the power line from the terminal, and
    the mounting member is arranged in a region surrounded by the terminal, the power line, and the outer surface of the housing, on a projection view to a planar surface extending along the extending direction of the power line from the terminal and passing through an axis of the terminal.

9. The exhaust-gas-purification catalytic heating device according to claim 2, comprising:
    a current sensor that detects current flowing through the power line; and
    a current cutoff device that cuts off electricity supplied from a power source to the current heater in accordance with detection of overcurrent at the current sensor.

10. The exhaust-gas-purification catalytic heating device according to claim 2,
    wherein the terminal cover is formed with a guiding portion so as to guide the power line continuous with the terminal, the guiding portion being arranged at a side opposite to the catalytic unit with respect to the terminal.

11. The exhaust-gas-purification catalytic heating device according to claim 1, comprising:
    a current sensor that detects current flowing through the power line; and
    a current cutoff device that cuts off electricity supplied from a power source to the current heater in accordance with detection of overcurrent at the current sensor.

12. The exhaust-gas-purification catalytic heating device according to claim 1,
    wherein the terminal cover is formed with a guiding portion so as to guide the power line continuous with the terminal, the guiding portion being arranged at a side opposite to the catalytic unit with respect to the terminal.

* * * * *